W. T. NICHOLSON.
MACHINES FOR CUTTING FILES.
No. 177,075. Patented May 9, 1876.
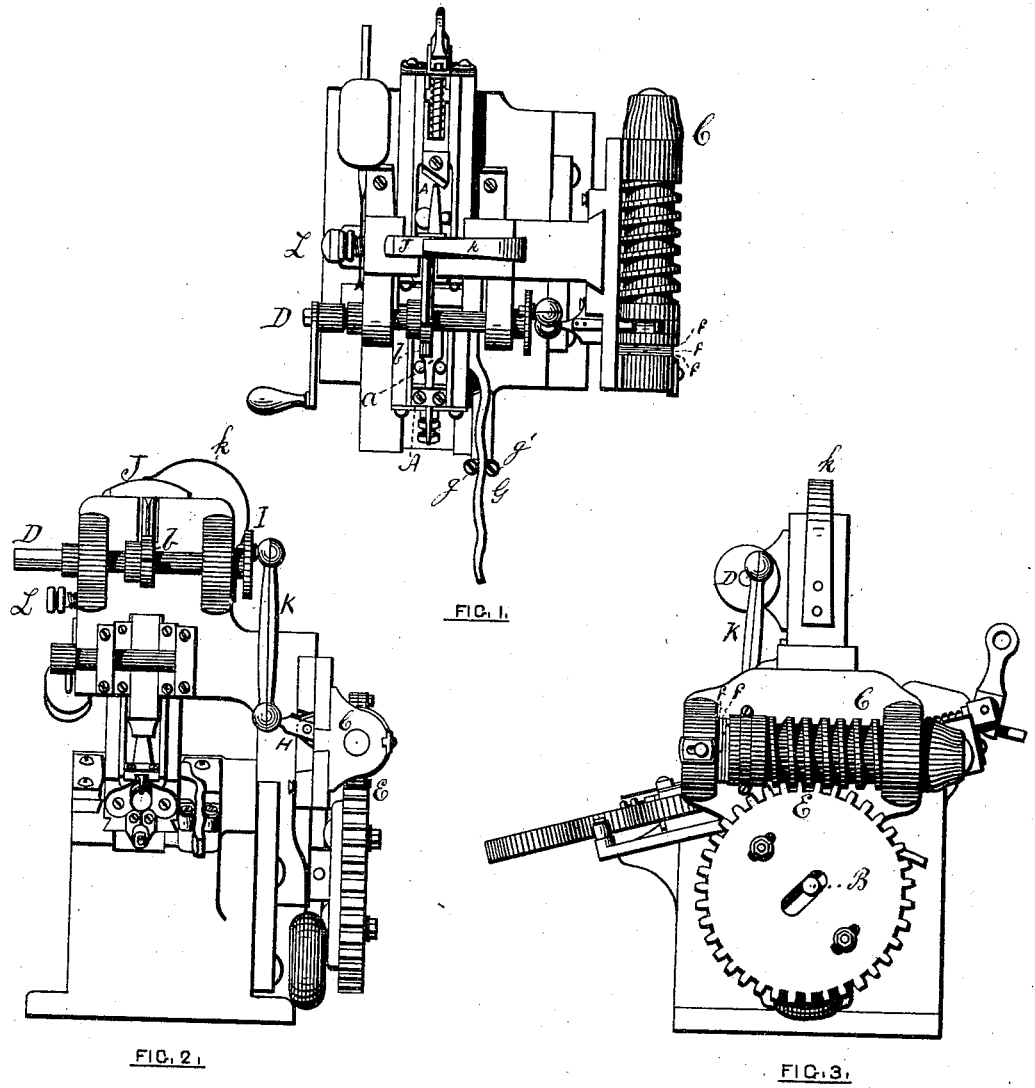
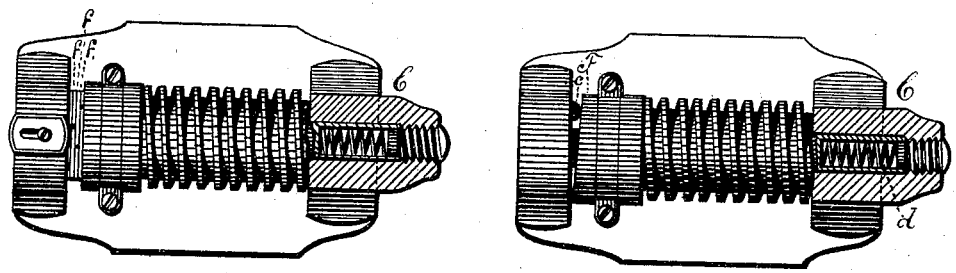
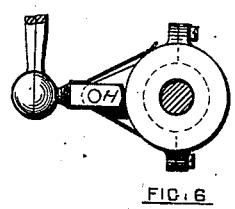

UNITED STATES PATENT OFFICE.

WILLIAM T. NICHOLSON, OF PROVIDENCE, RHODE ISLAND, ASSIGNOR TO NICHOLSON FILE COMPANY, OF SAME PLACE.

IMPROVEMENT IN MACHINES FOR CUTTING FILES.

Specification forming part of Letters Patent No. 177,075, dated May 9, 1876; application filed December 16, 1875.

*To all whom it may concern:*

Be it known that I, WILLIAM T. NICHOLSON, of the city and county of Providence, in the State of Rhode Island, have invented certain new and useful Improvements in Machines for Cutting Files, &c.; and I do hereby declare that the following specification, taken in connection with the drawings making a part of the same, is a full, clear, and exact description thereof.

The machine hereinafter described is an improvement upon the file-cutting machine described in the Letters Patent granted to me under date of April 5, 1864, No. 42,216, and the organization of the present machine, except in the particulars specially pointed out, may be understood to be the same as that of the machine described in said Letters Patent, to which description reference may be had.

In my former invention a regular progressive movement is not given to the bed upon which the blank to be cut is placed, but the movement is modified to the extent to which the worm-wheel which is connected with the bed, and which derives its motion from a worm-screw engaging therewith, is set eccentrically on its shaft, whereby a progressively-increasing width of spaces between the rows of teeth for a certain distance, and a correspondingly regularly-diminishing width of spaces for the remaining distance to be cut, is given to the file, which is held upon the file-bed, and partakes of the movement given to the latter, so that the result is the novel and useful one particularly described in the Letters Patent for an "improved file" granted to me on the 27th day of September, 1864, numbered 44,443, to which reference may be had.

The principal purpose of the present invention is to extend still further in the cutting of files the distinctive system or principle of the machine heretofore patented to me by introducing such modifications of structure and organization as will cause the file cut by the machine to have, in addition to the general characteristics described in my said patent dated September 27, 1864, a feature of irregularity as to the spacings between the successive rows which will make it certain that the successive teeth of the rows will not follow each other in the same longitudinal line, so as to cut the work in furrows, and thus, by mechanical means, obtain with certainty the same arrangement of the rows of teeth which has hitherto been exceptionally, and as the result of accident, obtained occasionally in files produced by the most skilled and long-practiced hand-file cutters.

Another feature of my invention consists in giving to the file-bed a variably progressive sinuous movement as the file is being cut, by causing the file-bed, which otherwise would have a variably progressive movement in a right line, to slowly vibrate on an axis in the line produced of the central axis of the cutter, whereby no two successive rows of teeth are exactly parallel with each other; but if their lines were extended for a considerable distance upon one side or the other of the file they would, by their convergence, intersect.

Referring to the drawings, A represents the well-known "Crum" semi-cylindrical rolling-bed, upon which the blank, *a*, to be cut is clamped. The bed is set at any preferred angle of inclination relatively to the plane of movement of a vertically-reciprocating cutter, and a progressive movement is given to the bed in the direction in which the blank is to be cut by means of the transverse shaft B, connected in any preferred way with the under side of the bed.

C is a worm-screw shaft, to which a constant rotary motion is given by means of a pawl and ratchet gear, or by equivalent mechanism, operated by the revolving shaft D, to which the driving-pulley is secured, and which shaft carries the tappet *b*, which lifts the cutter-stock, and in so doing winds up a spring, which, when released from the control of the tappet, imparts the necessary impulse to the cutter-stock to enable the cutter to cut a tooth upon the surface of the blank.

The worm-screw upon the shaft C engages with the teeth of the worm-wheel E, which latter is set eccentrically with reference to the driving shaft B, as shown at Figure 3, so that the progressive rate of movement of the file-bed throughout its entire extent of travel will be modified for each step of its movement by the degree of such eccentricity, and the successive rows of teeth be spaced accordingly. To accommodate the eccentricity of the worm-wheel E, the worm-screw shaft C has its bearings attached to a head-stock or frame which is arranged so that it can slide freely vertically, upward or downward, to the extent of the degree of eccentricity of the wheel E.

The foregoing constitutes a general statement of the mode of operation of the particular machine to which my hereinafter-described improvements are applied, and which enables a description of such improvements to be better understood.

The first feature of my present invention relates to a means for giving a variable differential movement to the file-bed during its progress underneath the cutting-chisel, so that while the general mode of operation resulting from the organization of the machine in respect to the movement of the bed above described shall be preserved, the spacing between the rows of teeth shall not increase in regular progression from the tip toward the middle of the blank to be cut, and then decrease regularly according to the same law toward the heel, but shall be modified as hereinafter explained.

At Fig. 5 is shown an enlarged view of a worm-screw shaft similar to that seen at Fig. 3. This shaft is, however, constructed so as to be capable of a slight endwise movement in its bearings, and this movement is effected in one direction by a revolving cam-face, F, bearing against a projecting pin or surface c, and in the other direction by a counteracting-spring, d.

Now, the worm-screw shaft C makes many revolutions in causing the worm-wheel E to make the single revolution required for cutting one file-blank, and the effect of the endwise movement which is given to it is to increase or diminish variably, according to the degree of inclination of the acting cam-face, the progressive movement of the worm-wheel.

The effect of this construction as expressed upon the face of the file after it is cut will be, that while the rows of teeth will generally be separated from each other by lands or spaces of regularly-increasing width from the tip of the file toward the middle, and by spaces of regularly-decreasing width from near the middle to the heel, resulting from the eccentricity of the worm-wheel E, yet all the teeth from tip to heel will be arranged in as many separate groups as the worm-screw makes revolutions during the cutting of the file—the rows of teeth which compose each group being spaced relatively to each other with variations from what would otherwise be their spacing, the aggregate sum of which is equal to the throw of the actuating-cam which gives an endwise movement to the worm-screw.

A further modification of this part of my invention is shown at Figs. 1 and 3, and in an enlarged view at Fig. 4. Instead of the single fixed cam-face F revolving with the worm-shaft, I prefer to employ a number of metallic disks or washers, f, the planes of whose faces are inclined toward each other, and arrange them side by side in a group upon the worm-shaft, in the same position occupied by the cam-face F in Fig. 5, each disk being free to revolve independently on the shaft and take any position relatively to the others which chance may determine. It is obvious that the movement of the file-bed which would otherwise result from the eccentric worm-wheel E will be modified on the same principle that it would be modified by the cam-face F, above described; but the rows of teeth from tip to heel will not be arranged in groups capable of definition on account of the ever-varying figure of the cam which the independently rambling disks of which it is made up induce.

A further feature of my invention consists in giving a sinuous movement to the file-bed, in order that no two contiguous rows of teeth shall be exactly parallel to each other. To accomplish this the file-bed is arranged in any preferred construction, so that it will, as it progresses, be capable of vibrating on an axis which is located in the line produced of the longitudinal axis of the cutter. To the side of the bed a guiding-lever, G, Fig. 1, is attached, the figure of which is the expression of the sinuous path which the bed is to describe. This lever extends backward from the file-bed, and lies between two stud-pins, $g$ $g'$, upon which may be friction-rollers. These pins are firmly attached to the bed-plate of the frame. It is quite apparent that the effect of this construction of laterally-vibratable file-bed, in combination with the peculiarly-shaped lever G and fixed stud-pins, will be to give to the file-bed, as it is traveling under the cutter, a movement which corresponds with the form of the lever, and thus the successive rows of teeth may be thrown out of parallelism with each other. This feature, broadly considered, is not new; but when it is applied to a machine which is so organized that the rows of teeth are variably spaced, (as hereinbefore described to be the characteristic operation of my machine,) the result is, that the two sets of mechanisms which accomplish these several effects combine to produce in the file made by the machine a peculiar advantage, in preventing any two consecutive teeth formed by the intersection of the "up-cut" and the "over-cut" from standing in the same right line, and, in fact, preventing every tooth in any one row from being in alignment with any other tooth in the same row.

Another feature of my machine consists in the substitution of a nipping-pawl, H, (shown at Fig. 6,) in place of a pawl engaging with ratchet-teeth, to give a rotary movement to the worm-screw shaft C. There is a certain amount of slip which is incident to the action of a pawl of this character, as is well known, and for the ordinary purposes for converting motion, for which such common device is used, this characteristic is a disadvantage; but in the organization in which I employ it this defect becomes a positive advantage by rendering, in a slight degree, uncertain the extent of rotation of the worm-screw shaft for each revolution of the driving-shaft, and in this way the nipping or friction pawl performs a function which contributes to the characteristic operation of the machine, before explained.

The crank end I of the driving-shaft D is connected with the arm which works the friction-pawl by means of a link, K, which is ball-and-socket-jointed to the wrist of the crank and to the end of the lever-arm of the pawl. This mode of connection, in view of the changes in plane of elevation which the worm-screw shaft occupies by reason of the eccentricity of the worm-wheel E, possesses a peculiar and special advantage.

When a file-cutting machine is started to cut a file-blank, the blows which the chisel makes ought not to be so hard upon the blank near the tip as at the wider parts of the blank. To enable the operator to be able to easily graduate the force of the blows when the machine is working upon the narrow portions of the blank, I have applied to the ram or sliding-cutter stock J, Fig. 2, an adjustable friction-brake, L, which, in this instance, consists simply of a screw, the end of which is shod or tipped with cork, rubber, wood, or some equivalent material. This screw has a head for convenience in turning it, and it enters a threaded hole through the side of the guide, in which the cutter-stock J slides, so that upon turning the screw to the right its end may be pressed against the side of the cutter-stock and cause a friction upon it, which, by adding to the resistance to be overcome by the spring $k$, which gives the impulse to the cutter, will diminish the force of the blow.

While I have described my several improvements as especially adapted to be applied to the machine for which Letters Patent were granted to me April 5, 1864, it is evident that an excellent result will follow in case the worm-screw heretofore described, having a variable endwise movement given to it as it revolves, is applied to a worm-wheel which is not set eccentrically on the shaft which drives the traveling bed; and, therefore, I do not intend to limit my invention to a combination which employs an eccentric worm-wheel as one of the elements.

Moreover, as it is not indispensably necessary that a worm-screw and a worm-wheel should be used to give movement to a file-bed, but, instead thereof, the common pawl-and-ratchet gear may be substituted, a part of my invention will be employed if there be given to the arm upon which the pawl is mounted a movement backward and forward by means of a rotating eccentric pivot-pin, or other equivalent means, independent of and additional to the normal reciprocating movement which the arm would otherwise have, so that the common step-by-step regular pawl-and-ratchet movement will be variably diminished or increased to effect the modification in the arrangement of the successive rows of teeth hereinbefore described. It is also evident, inasmuch as it is well known to the art of making file-machines that the file-bed need not be made to travel, but the chisel and the mechanism which operates it can be made to have the intermittent movement which, in the present instance, the file-bed has given to it, it is easy for any competent mechanic to give, by substantially the same mechanical means, the variable movement to the cutting-chisel and its adjunct which in my machine is given to the file-bed; and, therefore, I do not limit myself to the construction and arrangement of the machine, but mean to include all mere formal variations of organization and structure accomplishing the same mode of operation specified in the claims of invention, by substantially the same mechanical means.

What I claim as my invention, and desire to secure by Letters Patent, is—

1. The combination, with the mechanism which imparts motion to the bed of a file-cutting machine, of a worm-screw, or equivalent device, to which a variable endwise movement is given, whereby the teeth of the file, as they are cut, are arranged in groups, having varying spaces between the successive rows, substantially as described.

2. The combination, with the mechanism which imparts motion to the bed of a file-cutting machine, of a rambling cam, or equivalent device, substantially as described, for giving a variable uncertain movement to the file-bed within defined limits, whereby the teeth of the file, as they are cut, are variably and uncertainly spaced, as specified.

3. The combination, with a worm-wheel set eccentrically upon the shaft that actuates the traveling bed of a file-cutting machine, of a worm-screw, or equivalent device, to which a variable endwise movement is given as it revolves, substantially as described.

4. In combination with a file-bed to which a variable progressive movement is given, means, substantially as described, for giving a sinuous path of movement to the file-bed, whereby the consecutive rows of teeth are, in addition to being variably spaced, arranged out of parallelism with each other, as set forth.

5. The combination of the driving-shaft which works the cutter, a worm-screw adapted, through suitable gearing, to give movement to the file-bed, and which screw is arranged to occupy different planes of elevation to conform to the eccentricity of the gearing, and a link connecting the driving-shaft with the pawl-gear which drives the worm-screw by means of ball-and-socket-joint connection, substantially as described.

WILLIAM T. NICHOLSON.

Witnesses:
FRANK S. ARNOLD,
J. C. B. WOODS.